Patented Nov. 21, 1950

2,531,287

UNITED STATES PATENT OFFICE 2,531,287

PRODUCTION OF HYDROGEN CYANIDE

David R. Merrill, Moorestown, N. J., and William A. Perry, Bristol, Pa., assignors to Rohm & Haas Company, Philadelphia, Pa., a corporation of Delaware No Drawing. Application July 25, 1947,
Serial No. 763,762

8 Claims. (Cl. 23—151)

This invention relates to the preparation of hydrogen cyanide. It is particularly directed to improvements in the process of preparing hydrogen cyanide from gaseous mixtures containing ammonia and hydrocarbons.

It has been known for some time that volatile hydrocarbons can be reacted with ammonia to yield hydrogen cyanide. The heat required to effect the production of hydrogen cyanide from these starting materials may be supplied by reacting such materials with a proportion of oxygen which converts to water the hydrogen content which is in excess of that required to combine with the carbon and nitrogen needed to yield hydrogen cyanide. The amount of oxygen which may be used is theoretically given by such an equation as $2CH_4 + 2NH_3 + 3O_2 \rightarrow 2HCN + 6H_2O$, as a typical example, although the desired product can be produced with somewhat more or less oxygen than indicated purely on the basis of theoretical considerations. Instead of the direct reaction of hydrocarbon, ammonia, and oxygen, ammonia and oxygen may be reacted in a first stage to form nitric oxide which is then reacted with hydrocarbons.

The reaction to produce hydrogen cyanide from ammonia and hydrocarbons as starting materials has been effected in a zone where a catalyst is present. The catalyst has usually been a platinum or platinum alloy which may be supported on a carrier or may be used in the form of a catalytic gauze. The reaction is effected at high temperatures which may vary from about 900° C. to 1400° C., and the gases leave the catalytic zone at approximately such temperatures.

These gases contain not only hydrogen cyanide but also ammonia along with such gases as carbon monoxide, carbon dioxide, hydrogen, nitrogen, water vapor, and hydrocarbons. The hydrogen cyanide is recovered usually by passing the gases through a caustic alkali solution. It has been proposed to treat the gases from the catalyst zone with sulfuric acid prior to the absorption of hydrogen cyanide in order to remove ammonia. It has also been proposed to pass the hot gases through a heat exchanger to abstract their heat content prior to the absorption in alkali.

It has now been found that the contacting of hot gases with sulfuric acid causes a fuming or fogging of the acid or acid solution which causes great difficulty and prevents the proper carrying-out of the process.

It has also been found that substantial losses of hydrogen cyanide result when gases containing both hydrogen cyanide and ammonia are cooled, as practised heretofore, as by use of a heat exchanger. These losses result because the ammonia under the conditions of prior art practices causes polymerization of the hydrogen cyanide. This results not only in a decrease in the yield of the desired product but also in a decrease in efficiency of the cooling step since the surface of the heat exchanger becomes coated with gummy materials. This is in accordance with the known behavior of hydrogen cyanide which in the presence of ammonia and moisture forms so-called azulmic acids. For this same reason direct absorption in an aqueous system or cooling of gases with liquid water to the point where the hydrogen cyanide may be properly absorbed causes a serious loss of the desired product. No prior art methods have been adequate to cope with difficulties such as these.

In view of these and other similar considerations, it is an unexpected outcome to find that cooling can be accomplished advantageously with water and that dilute sulfuric acid can be used for the extraction of ammonia from the gases by observing the precautions and conditions set forth below.

It has been found that after hydrogen cyanide has been formed in the presence of a hot catalyst, as from contacting hydrocarbon gases, oxygen, and ammonia therewith, difficulties heretofore encountered, as above-set forth, are overcome or avoided when the hot gases leaving the catalyst and containing both hydrogen cyanide and ammonia are cooled by injecting into the hot gas stream fine droplets of water in an amount sufficient to cool the gas stream to a temperature below 300° C. but above 100° C. by rapid evaporation of the water droplets. No liquid water remains in contact with the gases for a long enough time to cause polymer formation. The gases are then contacted and further cooled with an aqueous solution containing sulfuric acid. They may then be passed to the absorbers or the hydrogen cyanide may be recovered therefrom in other well-known procedures.

Solutions suitable for removing ammonia may contain from 0.5% to 25% of sulfuric acid, at least at the start. Ammonium sulfate is, of course, formed therewith and the solution soon becomes one containing both sulfuric acid and ammonium sulfate. This has been found to be the most useful type of aqueous solution for effective and rapid removal of ammonia from the gas stream. A solution containing 0.5% to 5% of sulfuric acid and from 3% to 40% of ammonium sulfate may be sprayed into the gas stream or the gas stream may be passed through such a solution as it flows downwardly through a tower. In either case the solution, after being in contact with the gas stream, is preferably recirculated with cooling.

For particularly efficient operation there is drawn from the circulating solution a side stream which is heated to drive out and recover the hydrogen cyanide dissolved therein. Part of this stripped solution may be withdrawn and the ammonium sulfate or ammonia recovered therefrom. The rest of the solution may then be fortified with sulfuric acid and returned to the circulating liquors to supply the acid needed to absorb additional ammonia and to maintain the free sulfuric acid at a useful concentration in the solution in contact with the ammonia-containing gases.

As an alternative procedure a constant stream may be withdrawn from the circulating solution containing sulfuric acid and stripped with steam to drive off hydrogen cyanide, which may be passed to the scrubbed gas stream prior to recovery of hydrogen cyanide therefrom. The stripped liquor may then be discarded or, if desired, the ammonia may be recovered therefrom. In this procedure a constant addition of sulfuric acid is made to the circulating solution to maintain the concentration of sulfuric acid in the preferred range of 0.5% to 5% or at a higher concentration if so desired. During circulation, the scrubbing solution is cooled to remove heat gained from cooling the gases below 100° C. and condensing water vapor therefrom. In general, the amount of scrubbing liquor removed is equal to the amount of water vapor condensed plus the volume of acid solution added in adjusting the acidity.

The procedural steps which have been described depend one on the other and have interrelationships which promote the efficiency of the process taken as a whole. From the strictly analytical point of view the reaction between ammonia and hydrocarbon is promoted by oxygen in a reaction zone where a high temperature is reached on a catalyst body. The gases which leave this reaction or catalyst zone have absorbed much of the heat of reaction. Nevertheless the section of the reaction vessel adjacent to the catalyst unit becomes very hot. For optimum efficiency it is necessary to dissipate some heat from the catalyst unit and the portion of the reaction vessel adjacent the catalyst unit.

This may be done according to this invention by having the zone where the hot gases are cooled by evaporation of water droplets directly into the gas stream in close proximity to the catalyst unit. In this way the heat from the catalyst unit radiates to the cooler zone in juxtaposition thereto and provides a means for controlling temperatures in the catalyst zone and for prolonging the life of the catalyst unit. If the temperature of the catalyst unit tends to increase above the range for best efficiency for a given mixture of gases, sufficient cooling can be provided by increasing the evaporation of water, provided the temperature of the gas stream in the cooling zone remains above 100° C. Conversely, if the temperature of the catalyst zone tends to fall below the temperature range for maximum efficiency for a given gas mixture, the cooling of the gases in the cooling zone may be lessened, provided that the temperature of the gas stream is brought below 300° C. at this stage.

The temperature of the catalyst zone is further controlled by the proximity of the zone wherein ammonia is removed from the gas and the gases are further cooled by contact with the aqueous solution containing sulfuric acid in this third zone. The solution containing sulfuric acid is maintained at 25° to 100° C., preferably between 50° and 90° C., and serves to lower the temperature of the gas stream at the same time that ammonia is removed therefrom. In this way all three zones and the procedural steps which occur in each have an interdependence and contribute to efficiency in producing hydrogen cyanide from ammonia and volatile hydrocarbons. When cooling is accomplished in these two zones and ammonia is removed in the third zone, there is no appreciable loss of hydrogen cyanide.

As an illustrative example of the process described above, there may be considered the following preparation of hydrogen cyanide. A mixture of one part by volume of ammonia, 1.2 parts of natural gas containing methane to the extent of 90% and ethane 6% with some higher hydrocarbons and inerts, and 6.5 parts of air was passed through a platinum gauze catalyst operating at 1100° C. The hot gases from the catalyst contained 7% of hydrogen cyanide and 2% of ammonia. The total gas flow was at the rate of 2200 cu. ft. per hour (NTP). The sensible heat content of the gases above 0° C. was 118,000 B. t. u. per hour. As the gases left the catalyst zone, they were sprayed with 13 gallons of water per hour through nozzles operated under 100 lbs. pressure to give fine droplets. The temperature of the gases was thus dropped to about 200° C. All of the injected water was evaporated.

The gases then entered a zone in which they were sprayed with a circulating solution containing 1% of sulfuric acid, 4% of ammonium sulfate, and about 95% of water. This solution was supplied at a temperature of 65° C. and at a rate of 280 gallons per hour. The scrubbing liquid was collected in the lower part of this zone where it had a temperature of 70° C. The gases were also at 70° C. at this point. A constant level of liquid was maintained by withdrawing solution as it accumulated, stripping it with steam to remove dissolved hydrogen cyanide, and discarding the excess solution. Solution was withdrawn at about 15 gallons per hour. The bulk of the scrubbing solution was circulated whereby enough heat was withdrawn to bring the circulating liquid below 65° C. Dilute sulfuric acid was metered into this solution to supply about seven pounds per hour of sulfuric acid. This produced a relatively cool gas stream which was free of ammonia and from which the hydrogen cyanide was recovered without loss.

The above procedure is applicable to the processing of hot gases containing hydrogen cyanide and ammonia obtained from other volatile hydrocarbons, from other reactants including methanol, for example, in place of the hydrocarbons, and from slightly altered reaction steps where the reaction with oxygen is effected in several stages, a procedure mentioned above.

By reacting the hydrocarbon gas and ammonia at high temperatures in a catalyst zone in juxtaposition to a cooling zone, passing hot gases containing ammonia and hydrogen cyanide from the catalyst zone to the cooling zone, then cooling these gases by injecting finely divided water into them without permitting liquid water to remain in this zone, passing the thus cooled gases to a scrubbing zone, and there removing the ammonia from the gases with a dilute solution of sulfuric acid, and simultaneously cooling the gases below 100° C. in this zone there is provided a marked advance in the art of preparing hydrogen cyanide. This compound is produced with high efficiency, losses previously encountered are avoided, and a final product of excellent purity is obtained.

We claim:

1. In the process of producing hydrogen cyanide in gases at high temperatures wherein the hot gases contain ammonia along with hydrogen cyanide, the steps which comprise spraying droplets of water into the hot gases containing ammonia and hydrogen cyanide in an amount sufficient to cool the gases to a temperature between 100° C. and 300° C. by evaporation of all of said droplets and contacting the thus treated gases with an aqueous solution containing sulfuric acid at a temperature above 25° C. and below 100° C. in an amount to bring the temperature of the gases below 100° C., whereby ammonia is removed from the gaseous mixture.

2. In the process of producing hydrogen cyanide in gases at high temperatures wherein the hot gases contain ammonia along with hydrogen cyanide, the steps which comprise spraying droplets of water into the hot gases containing ammonia and hydrogen cyanide in an amount sufficient to cool the gases to a temperature between 100° C. and 300° C. by evaporation of all of said droplets and contacting the thus treated gases with an aqueous solution at a temperature above 25° C. and below 100° C. in an amount to bring the temperature of the gases below 100° C., said solution containing 0.5% to 25% of sulfuric acid, whereby ammonia is removed from the gaseous mixture.

3. In the process of producing hydrogen cyanide in gases at high temperatures wherein the hot gases contain ammonia along with hydrogen cyanide, the steps which comprise spraying droplets of water into the hot gases containing ammonia and hydrogen cyanide in an amount sufficient to cool the gases to a temperature between 100° C. and 300° C. by evaporation of all of said droplets and contacting the thus treated gases with an aqueous solution at a temperature above 25° C. and below 100° C. in an amount to bring the temperature of the gases below 100° C., said solution containing 0.5% to 5% of sulfuric acid and 3% to 40% of ammonium sulfate, whereby ammonia is removed from the gaseous mixture.

4. In the process of producing hydrogen cyanide in gases at high temperatures wherein the hot gases contain ammonia along with hydrogen cyanide, the steps which comprise spraying droplets of water into the hot gases containing ammonia and hydrogen cyanide in an amount sufficient to cool the gases to a temperature between 100° C. and 300° C. by evaporation of all of said droplets and contacting the thus treated gases with an aqueous solution at a temperature above 50° C. and below 90° C. in an amount to bring the temperature of the gases below 90° C., said solution containing 0.5% to 5% of sulfuric acid and 3% to 40% of ammonium sulfate, whereby ammonia is removed from the gaseous mixture, withdrawing a portion of said aqueous solution after it has been in contact with the gases and supplying sulfuric acid to said solution to maintain the specified acid content thereof.

5. In the process of producing hydrogen cyanide from contacting hydrocarbon gases and ammonia with a hot catalyst wherein the gaseous mixture leaving the catalyst is at a high temperature and contains ammonia the steps which comprise injecting into the hot gaseous mixture leaving the catalyst fine droplets of water in an amount sufficient to cool the gases to a temperature below 300° C. but above 100° C. by evaporation of all of the droplets into the hot gas and contacting the thus cooled gases with an aqueous solution containing sulfuric acid at a temperature between 50° C. and 90° C. whereby ammonia is removed from the gaseous mixture.

6. In the process of producing hydrogen cyanide from contacting hydrocarbon gases and ammonia with a hot catalyst wherein the gaseous mixture leaving the catalyst is at a high temperature and contains ammonia the steps which comprise injecting into the hot gaseous mixture leaving the catalyst fine droplets of water in an amount sufficient to cool the gases to a temperature below 300° C. but above 100° C. by evaporation of all of the droplets into the hot gases and contacting the thus cooled gases with an aqueous solution, at a temperature of 50° C. to 90° C., containing 0.5% to 5% of sulfuric acid and 3% to 40% of ammonium sulfate, whereby ammonia is removed from the gaseous mixture.

7. In the process of producing hydrogen cyanide from contacting hydrocarbon gases and ammonia with a hot catalyst wherein the gaseous mixture leaving the catalyst is at a high temperature and contains ammonia the steps which comprise injecting into the hot gaseous mixture leaving the catalyst fine droplets of water in an amount sufficient to cool the gases to a temperature below 300° C. but above 100° C. by evaporation of all the droplets into the hot gases, contacting the thus cooled gases with an aqueous solution containing 0.5 to 5% of sulfuric acid at a temperature between 25° C. and 100° C., removing a portion of said solution after being in contact with the hydrogen cyanide-containing gases, heating said portion to strip hydrogen cyanide therefrom, separating the stripped solution into two parts, adding sulfuric acid to one part of the stripped solution, cooling it to a temperature above 25° C. and below 100° C., and returning it to the aqueous solution being contacted with the gases containing hydrogen cyanide and ammonia.

8. The process of preparing hydrogen cyanide which comprises reacting a volatile hydrocarbon and ammonia with oxygen in a catalyst zone, whereby the gases leaving said zone are at a high temperature and contain hydrogen cyanide and ammonia, passing the hot gases from said catalyst zone to a second zone in close proximity to said catalyst zone and injecting thereinto water in fine droplets, evaporating all of said water in said zone, the amount of water evaporated cooling the gases to a temperature between 100° C. and 300° C., passing the gases at this temperature into a third zone, contacting the gases in this third zone with an aqueous solution of sulfuric acid and maintaining the concentration of the acid in said solution at 0.5% to 5% and the temperature of the aqueous solution between 50° C. and 90° C., thereby removing ammonia from said gases and cooling them to at least 90° C.

DAVID R. MERRILL.
WILLIAM A. PERRY.

REFERENCES CITED

The following references are of record in the file of this patent:

UNITED STATES PATENTS

| Number | Name | Date |
|---|---|---|
| 642,782 | Bueb | Feb. 6, 1900 |
| 1,562,914 | Poindexter | Nov. 24, 1925 |
| 1,608,700 | Lacy | Nov. 30, 1926 |
| 1,706,301 | Kendall | Mar. 19, 1929 |
| 1,934,610 | Wheeler | Nov. 7, 1933 |